United States Patent
Humer et al.

(10) Patent No.: US 6,789,846 B2
(45) Date of Patent: Sep. 14, 2004

(54) VEHICLE SEAT HAVING A MOVABLE HEAD RESTRAINT

(75) Inventors: Mladen Humer, Eastpointe, MI (US); Mark S. Sebby, Brighton, MI (US)

(73) Assignee: Lear Corporation, Southfield, MI (US)

( * ) Notice: Subject to any disclaimer, the term of this patent is extended or adjusted under 35 U.S.C. 154(b) by 77 days.

(21) Appl. No.: 10/327,432

(22) Filed: Dec. 20, 2002

(65) Prior Publication Data

US 2004/0119324 A1 Jun. 24, 2004

(51) Int. Cl.$^7$ .............................. B60N 2/42; A47C 1/10
(52) U.S. Cl. ................... 297/216.12; 297/408; 297/410
(58) Field of Search ........................... 297/216.12, 408, 297/410

(56) References Cited

U.S. PATENT DOCUMENTS

| | | |
|---|---|---|
| 2,869,622 A | 1/1959 | Petersen et al. |
| 3,008,767 A | 11/1961 | Fox |
| 3,397,911 A | 8/1968 | Brosius, Sr. |
| 3,498,670 A | 3/1970 | Finch et al. |
| 3,680,912 A | 8/1972 | Matsuura |
| 4,082,354 A | 4/1978 | Renner et al. |
| 4,190,291 A | 2/1980 | Korger |
| 4,511,180 A | 4/1985 | Klaus |
| 4,626,028 A | 12/1986 | Hatsutta et al. |
| 4,762,367 A | 8/1988 | Denton |
| 4,822,102 A | 4/1989 | Duvenkamp |
| 5,011,225 A | 4/1991 | Nemoto |
| 5,205,585 A | 4/1993 | Reuber et al. |
| 5,378,043 A | 1/1995 | Viano et al. |
| 5,484,189 A | 1/1996 | Patterson |
| 5,528,829 A | * 6/1996 | Rees ........................ 29/897.2 |
| 5,664,841 A | 9/1997 | Dal Monte |
| 5,772,280 A | 6/1998 | Massara |
| 5,795,019 A | 8/1998 | Wieclawski |
| 5,823,619 A | 10/1998 | Heilig et al. |
| 5,882,071 A | 3/1999 | Fohl |
| 5,884,968 A | 3/1999 | Massara |
| 5,927,804 A | 7/1999 | Cuevas |
| 5,934,750 A | 8/1999 | Fohl |
| 5,938,279 A | 8/1999 | Schubring et al. |
| 5,961,182 A | 10/1999 | Dellanno |
| 6,017,086 A | 1/2000 | Meyer et al. |
| 6,019,424 A | 2/2000 | Ruckert et al. |

(List continued on next page.)

FOREIGN PATENT DOCUMENTS

| | | | |
|---|---|---|---|
| DE | 2 152 202 | 10/1971 | |
| DE | 2 152 437 | 10/1971 | |
| JP | 06269334 A | * 9/1994 | ............ A47C/7/38 |
| WO | WO 98/09838 | 3/1998 | |
| WO | WO 98/16406 | 4/1998 | |

OTHER PUBLICATIONS

Tan, Abstract of Patent # JP 406269334 A, Mar. 19, 1993.*
J. Latchford and E.C. Chirwa, "Airbag Head Restraint System", Automotive Engrng., Faculty of Technology, Bolton Institute, UK.

Primary Examiner—Peter M. Cuomo
Assistant Examiner—Sarah C. Burnham
(74) Attorney, Agent, or Firm—Bill C. Panagos (57) ABSTRACT

A vehicle seat for use with a vehicle includes a seatback frame and a guide member attached to the seatback frame. A slide bracket is attached to the seatback frame below the guide member, and the slide bracket has a slot. The seat further includes a headrest arrangement movably associated with the seatback frame. The headrest arrangement includes a headrest and a support structure connected to the headrest and engageable with the guide member. The support structure includes a projection that extends into the slot and that is movable with respect to the slide bracket from an initial position to an actuated position. Upon sufficient impact to the vehicle, the projection moves from the initial position toward the actuated position and the support structure moves along the guide member, such that movement of the headrest is guided to provide support for the head of an occupant.

21 Claims, 3 Drawing Sheets

U.S. PATENT DOCUMENTS

| | | |
|---|---|---|
| 6,022,074 A | 2/2000 | Swedenklef |
| 6,024,406 A | 2/2000 | Charras et al. |
| 6,033,018 A | 3/2000 | Fohl |
| 6,082,817 A | 7/2000 | Muller |
| 6,088,640 A | 7/2000 | Breed |
| 6,213,548 B1 | 4/2001 | Van Wynsberghe et al. |
| 6,250,714 B1 * | 6/2001 | Nakano et al. ........ 297/216.12 |
| 6,340,206 B1 * | 1/2002 | Andersson et al. .... 297/216.14 |
| 6,354,659 B1 * | 3/2002 | Andersson et al. .... 297/216.14 |
| 6,375,262 B1 * | 4/2002 | Watanabe ................ 297/284.4 |
| 6,416,125 B1 * | 7/2002 | Shah et al. ............ 297/216.12 |

* cited by examiner

VEHICLE SEAT HAVING A MOVABLE HEAD RESTRAINT

BACKGROUND OF THE INVENTION

1. Field of the Invention

The invention is directed to a vehicle seat having a movable head restraint or headrest.

2. Background Art

Vehicle seats having movable headrests are known in the vehicle seating art. Examples of such vehicle seats are disclosed in U.S. Pat. No. 4,822,102 and U.S. Pat. No. 4,762,367.

SUMMARY OF THE INVENTION

Under the invention, a vehicle seat for use with a vehicle includes a seatback frame and a guide member attached to the seatback frame. A slide bracket is attached to the seatback frame below the guide member, and the slide bracket has a slot. The seat further includes a headrest arrangement movably associated with the seatback frame. The headrest arrangement includes a headrest and a support structure connected to the headrest and engageable with the guide member. The support structure includes a projection that extends into the slot and that is movable with respect to the slide bracket from an initial position to an actuated position. Upon sufficient impact to the vehicle, the projection moves from the initial position toward the actuated position and- the support structure moves along the guide member, such that movement of the headrest is guided to provide support for the head of an occupant.

DETAILED DESCRIPTION OF THE PREFERRED EMBODIMENT(S)

Figure 1:
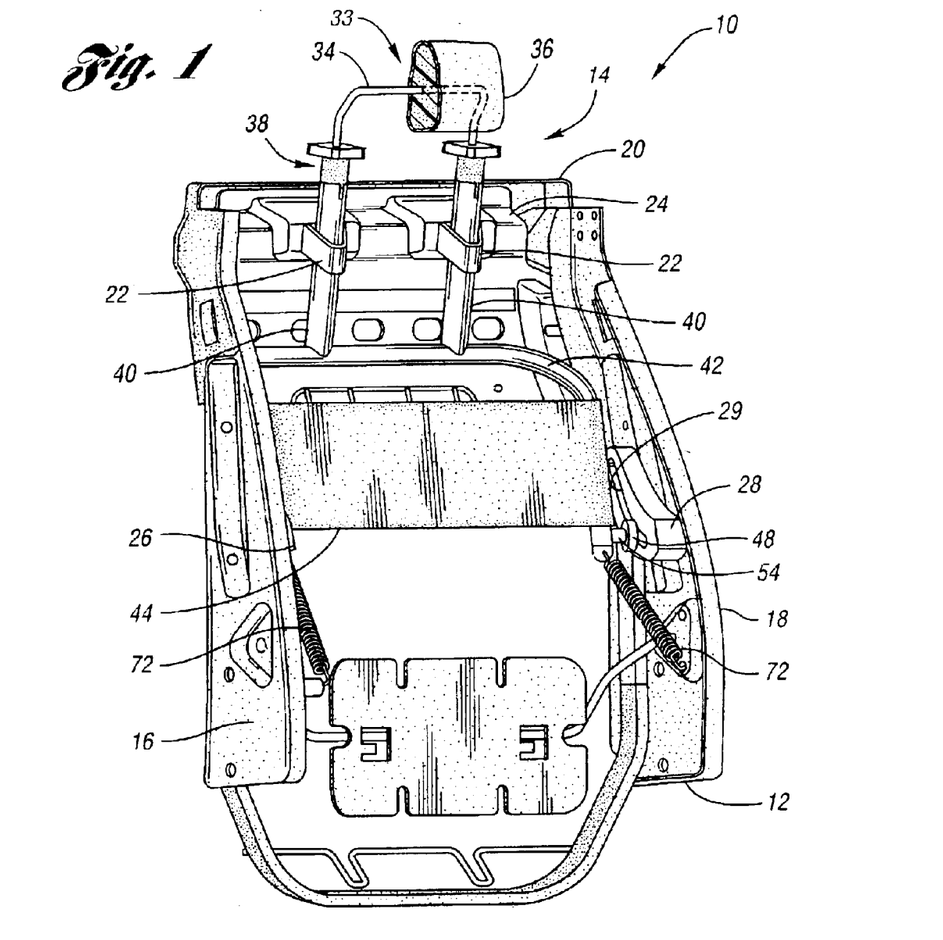
FIG. 1 is a perspective view of a vehicle seat according to the invention, wherein the vehicle seat includes a seatback frame, first and second slide brackets attached to the seatback frame, and a headrest arrangement movably associated with the seatback frame.

FIG. 1 shows a vehicle seat 10 according to the invention for use with a motor vehicle. For example, the vehicle seat 10 may be mounted on a vehicle floor (not shown). The vehicle seat 10 includes a seatback frame 12 connected to a lower seat cushion frame (not shown) in any suitable manner, such as with a recliner mechanism (not shown) that allows the seatback frame 12 to pivot between a full upright position (shown in FIG. 1) and a reclined position (not shown). The vehicle scat 10 further includes a movable headrest arrangement 14 supported by and movably associated with the seatback frame 12, as described below in detail.

The seatback frame 12 includes first and second side portions, such as first and second side supports 16 and 18, respectively, and an upper laterally extending portion or cross member 20. Although the side supports 16, 18 and cross member 20 are shown as separate components that are joined together in any suitable manner, such as by welding, two or more of these components 16, 18 and 20 may be integrally formed.

In the embodiment shown in FIG. 1, the seatback frame 12 also includes at least one guide member, such as guide bushings 22, for guiding movement of the headrest arrangement 14, as explained below in greater detail. The guide bushings 22 may be integrally formed with the seatback frame 12, or attached to a portion of the seatback frame 12 in any suitable manner. In the embodiment shown in FIG. 1, for example, the guide bushings 22 are integrally formed as part of a guide bracket 24, which is welded to the cross member 20.

Figure 2:
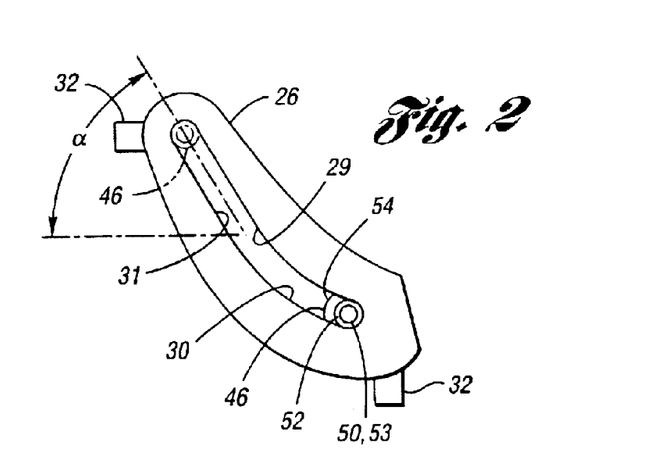
FIG. 2 is a side view of the first slide bracket and a first slider engaged with the first slide bracket.

First and second slide brackets 26 and 28, respectively, are attached to the first and second side supports 16 and 18, respectively. Referring to FIGS. 1 and 2, each slide bracket 26 and 28 has a slot 29 for guiding or otherwise controlling movement of the headrest arrangement 14 as described below in detail. While each slot 29 may have any suitable configuration, in the embodiment shown in FIGS. 1 and 2, each slot 29 has a curved portion 30 and a straight portion 31 extending from the curved portion 30. Referring to FIG. 2, each straight portion 31 may extend at any suitable angle α with respect to a horizontal line when the seatback frame 12 is in the full upright position. For example, angle α may be in the range of 0 to 55 degrees, and more particularly in the range of 0 to 45 degrees. In one embodiment of the invention, angle α is approximately 40 degrees. Examples of other slot configurations include curved slots and straight slots, such as a straight slot that extends at an angle in the range of 0 to 45 degrees with respect to a horizontal line.

The slide brackets 26 and 28 may be made of any suitable material, such as plastic, steel, aluminum, or other metal. Furthermore, the slide brackets 26 and 28 may be manufactured in any suitable manner, such as by a molding process or a stamping process. In addition, the slide brackets 26 and 28 may be attached to the side supports 16 and 18 in any suitable manner, such as by welding. Referring to FIG. 2, each slide bracket 26 and 28 may also include tabs 32 to facilitate attachment to the side supports 16 and 18. Alternatively, the slide brackets 26 and 28 may be integrally formed with the side supports 16 and 18.

The headrest arrangement 14 includes a headrest 33 having a headrest frame or cushion frame 34 and a headrest cushion 36 attached to the cushion frame 34. The headrest arrangement 14 further includes a support structure 38 connected to the cushion frame 34. While the support structure 38 may have any suitable configuration, in the embodiment shown in FIG. 1, the support structure 38 includes an upper portion, such as two generally vertical risers 40, attached to a generally U-shaped main body or support frame 42. Alternatively, if the seatback frame 12 includes only one guide bushing 22, the support structure 38 may be provided with only one riser 40.

The support structure 38 further includes an impact target 44 attached to the support frame 42, and first and second laterally extending projections, such as first and second sliders 46 and 48, respectively, also attached to the support frame 42. Each slider 46 and 48 is configured to extend into a respective slot 29 such that the slider 46, 48 is moveable along the slot 29 from an initial position (shown in FIGS. 1–3) to an actuated position (shown in phantom in FIGS. 2 and 3 for slider 46) disposed above and rearward of the initial position. A sufficient rearward force acting upon the impact target 44 causes the sliders 46 and 48 to move from the initial positions to the actuated positions, thereby causing the headrest 33 to move upwardly and forwardly from a first position (shown in FIGS. 1 and 3) to a second position (shown in phantom in FIG. 3).

Each slider 46 and 48 may have any suitable configuration, and may be made of any suitable material or materials. In the embodiment shown in FIGS. 1–4, for example, each slider 46 and 48 includes a peg. 50, such as a bolt, surrounded by a bushing 52. Furthermore, in the embodiment shown in FIGS. 1–4, each peg 50 is made of steel and each bushing 52 is made of plastic. Other suitable materials for the pegs 50 include aluminum, titanium and other metals, and other suitable materials for the bushings 52 include TEFLON™ coated materials and other non-stick or pre-lubricated materials. Alternatively, the bushings 52 may be omitted if not required for a particular application.

Figures 3, 4, 5:
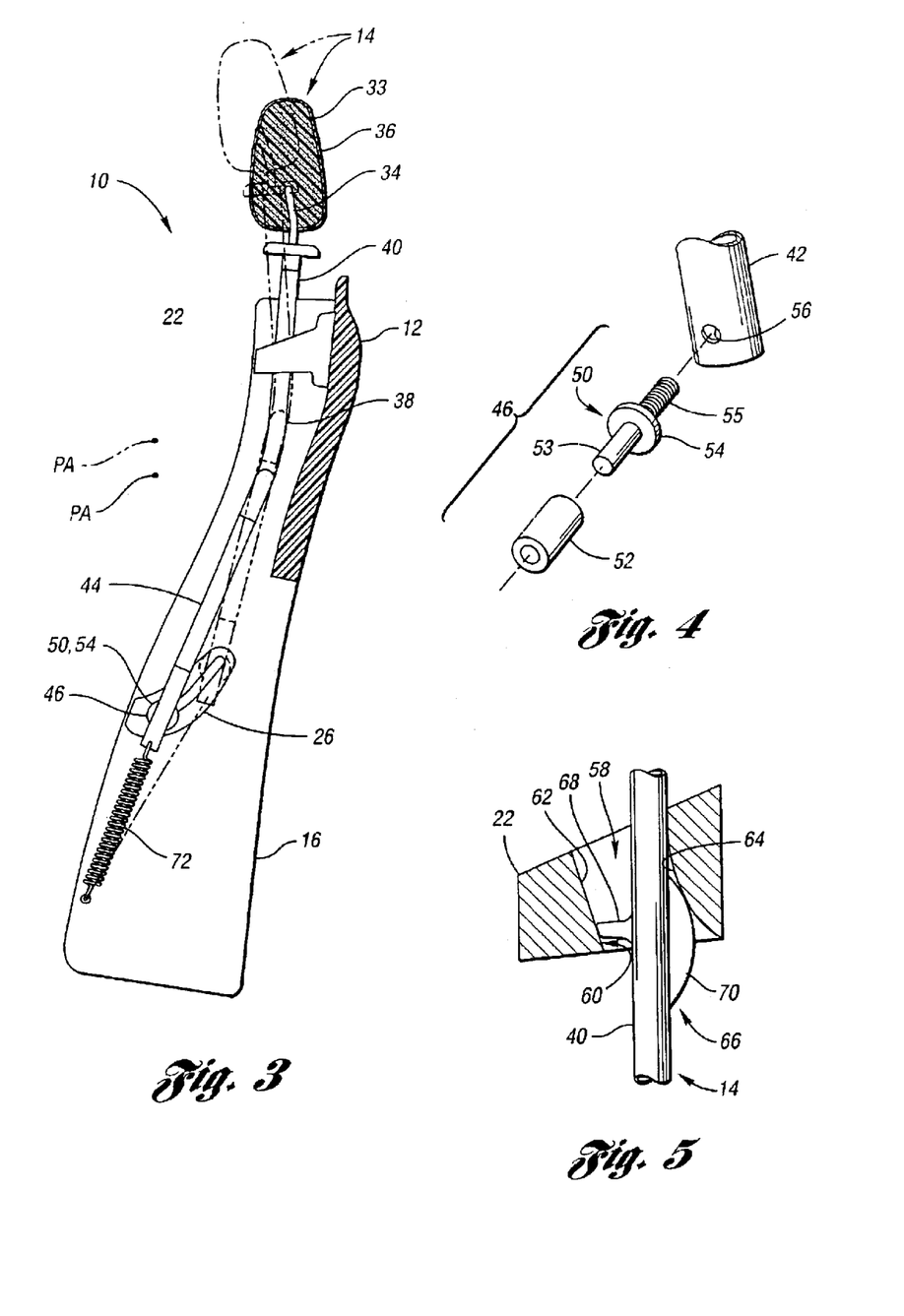
FIG. 3 is a cross-sectional side view of the vehicle seat with an initial position of the headrest arrangement shown in solid lines and an actuated position shown in phantom.
FIG. 4 is an exploded perspective view of the first slider.
FIG. 5 is a cross-sectional view of a guide member for guiding movement of the headrest arrangement.

Referring to FIGS. 2–4, each peg 50 may include an elongated main body or peg body 53 and a radially extending portion, such as flange 54, on the peg body 53. The flange 54 is engageable with a respective slide bracket 26 or 28 for controlling transverse movement of the headrest arrangement 14. In the embodiment shown in FIGS. 2–4, each flange 54 is disposable between the frame 42 and a respective slider 26 or 28. Furthermore, referring to FIG. 4, each peg body 53 may include a threaded section 55 that is engageable with a threaded aperture 56 formed in the frame 42. Such an attachment scheme enables the sliders 46 and 48 to be removed and replaced. Alternatively, each slider 46 and 48 may be attached to the frame 42 in any suitable manner, such as by welding.

Referring to FIGS. 1 and 3, operation of the seat 10 will now be described in more detail. Generally, sufficient rearward loading on the impact target 44 by a seat occupant, such as during a rear crash event, causes the headrest arrangement 14 to pivot with respect to the seatback frame 12 about a pivot axis PA, which may be a fixed or variable (instantaneous) pivot axis (in the embodiment shown in FIG. 3, the pivot axis is a variable pivot axis that moves from an initial position to a final position above the initial position). More specifically, sufficient rearward loading on the impact target 44 causes the sliders 46 and 48 to move along the slots 29 from the initial positions to the actuated positions. As a result, the impact target 44 moves generally rearwardly and upwardly, which causes the risers 40 to move upwardly through the guide bushings 22. As the risers 40 move upwardly, interaction between the risers 40 and the guide bushings 22 causes the risers 40 to rotate forwardly, thereby causing the headrest 33 to move forwardly, in addition to moving upwardly, so as to provide support to the head of the occupant.

Referring to FIG. 5, for example, each guide bushing 22 may include a guideway 58 having a cam configuration 60 that includes first and second guideway walls 62 and 64, respectively. Each riser 40 may also include a follower, such as a cam 66 having first and second follower portions 68 and 70, respectively. As each riser 40 moves upwardly, the first and second follower portions 68 and 70, respectively, engage or otherwise cooperate with the first and second guideway walls 62 and 64, respectively, which causes the risers 40 to rotate forwardly.

Alternatively, the seatback frame 12 and headrest arrangement 14 may have any suitable configuration that cooperates with the slide brackets 26, 28 and sliders 46, 48 to enable the risers 40 to move upwardly and forwardly in response to rearward loading on the impact target 44. For example, the seatback frame 12 may include one or more guide members that each have any suitable configuration, such as a guide tube, band or bracket that receives a respective riser 40. As another example, each riser 40 may include a first guide member, and the seatback frame 12 may include a follower, which may be referred to as a second guide member. Additional details regarding guide member and follower configurations are disclosed in U.S. application Ser. No. 10/184,675, which is hereby incorporated by reference in its entirety.

The seat 10 may also include one or more biasing members operatively associated with the seatback frame 12 and the support structure 38 to bias the headrest 33 against upward and forward movement. In the embodiment shown in FIGS. 1 and 3, for example, the seat 10 includes two return springs 72 connected between the side supports 16, 18 and the support frame 42. In addition or as an alternative, the seat 10 may include one or more dampers (not shown) operatively associated with the seatback frame 12 and the support structure 38 to retard movement of the headrest 33 from the second position toward the first position.

The seat 10, according to the invention, provides several benefits. First, the slide brackets 26 and 28 provide controlled movement of the headrest arrangement 14. Second, the slots of the slide brackets 26 and 28 may be configured to provide any suitable movement path. Third, because the seat 10 includes two slide brackets 26 and 28, one slide bracket 26 or 28 may be used to transversely locate the headrest arrangement 14 with respect to the seatback frame 12, while the other slide bracket 26 or 28 may be configured to allow the corresponding slider 46 or 48 to float in a transverse direction to inhibit binding.

Alternatively, the seat 10 may be provided with only one slide bracket and one slider. For example, a slide bracket may be mounted on a lower cross member (not shown) that extends between the side supports 16 and 18 at a location below the cross member 20, and a corresponding slider may be mounted on a lateral support (not shown) attached to the support frame 42.

Furthermore, the seat 10 may be configured such that the headrest arrangement 14 is moveable in the above described manner without requiring loading on the impact target 44. For example, the headrest 33 may be provided with sufficient mass such that, as a result of a sufficient impact to the vehicle (e.g., a front crash event), forward inertia of the headrest 33 causes the headrest arrangement 14 to pivot or otherwise move with respect to the seatback frame 12.

Figure 6:
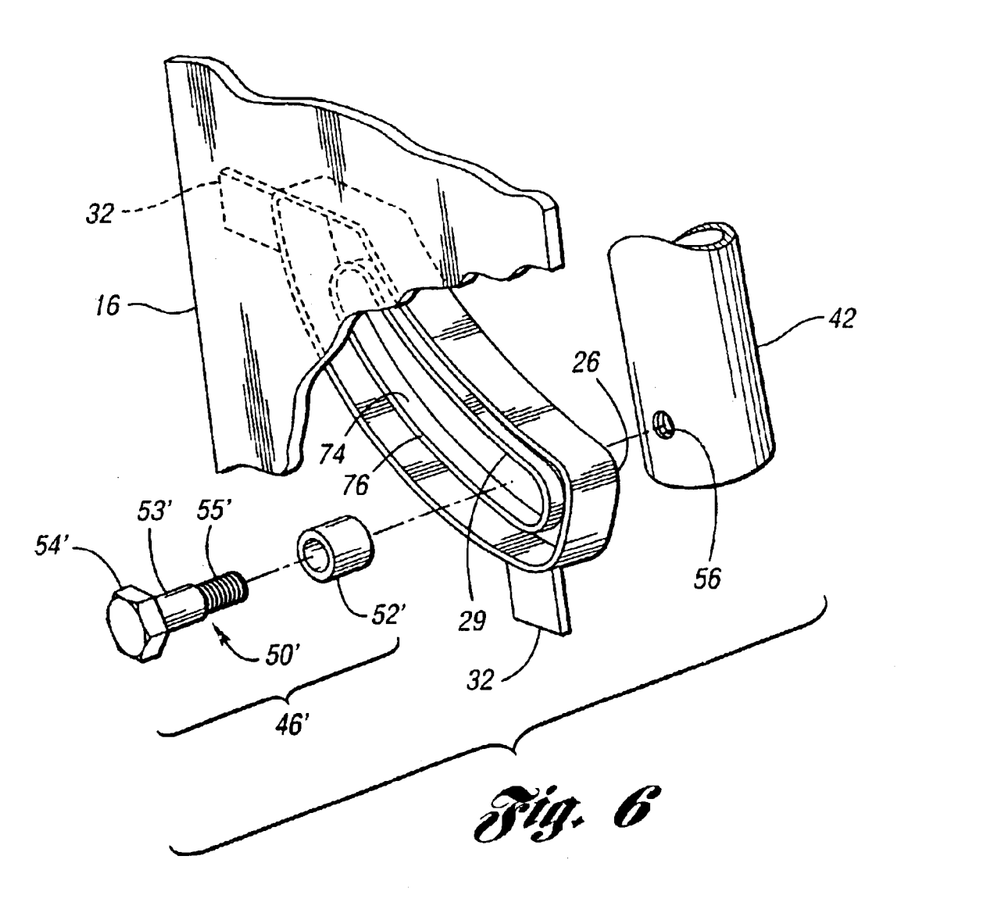
FIG. 6 is an exploded perspective view of an alternative embodiment of a slider according to the invention.

FIG. 6 shows an alternative embodiment 46' of a slider, which may be used in place of the slider 46 and/or the slider 48. The slider 46' includes a peg 50', such as a shoulder bolt, surrounded by a bushing 52'. Furthermore, the peg 50' and bushing 52' may be made of any suitable materials, such as described above with respect to the sliders 46 and 48. Alternatively, the bushing 52' may be omitted if not required for a particular application.

Still referring to FIG. 6, the peg 50' may include an elongated main body or peg body 53' and a radially extending portion, such as flange 54', on the peg body 53'. The flange 54' is engageable with a respective slide bracket 26 or 28 for controlling transverse movement of the headrest arrangement 14. Furthermore, the peg body 53' may include a threaded section 55' that is engageable with threaded aperture 56 formed in the frame 42 for attaching the slider 46' to the frame 42. Such an attachment scheme enables the slider 46' to be removed and replaced. Alternatively, the slider 46' may be attached to the frame 42 in any suitable manner, such as by welding.

When using the slider 46', the peg 50' having the bushing 52' mounted thereon may be first inserted through an aperture (not shown) in a respective side support 16 or 18, and then through a respective slide bracket 26 or 28. The peg 50' may then be attached to the frame 42. Thus, when the slider 46' is used with a respective slide bracket 26 or 28, the respective slide bracket 26 or 28 extends between the frame 42 and the flange 54'. With such an arrangement, a sufficient portion of the respective slide bracket 26 or 28 is spaced away from the corresponding side support 16 or 18 to allow movement of the flange 54' between the slide bracket 26 or 28 and the corresponding side support 16 or 18 For example, in the embodiment shown in FIG. 6, the portion of the slide bracket 26 defining the slot 29 is recessed from the portion that abuts the side support 16, such that a gap is defined for receiving the flange 54'. Furthermore, in the embodiment shown in FIG. 6, the portion of the slide bracket 26 that defines the slot 29 also defines a flange 74 having a flange edge 76 along which the flange 54' may slide. Because the flange edge 76 is narrow, the friction between the flange edge 76 and the flange 54' is relatively small. Alternatively, a respective slide bracket 26 or 28 may have any suitable configuration sufficient to receive the flange 54' between the slide bracket 26 or 28 and the corresponding side support 16 or 18.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat for use with a vehicle, the vehicle seat comprising:
    a seatback frame;
    a guide member attached to the seatback frame;
    a slide bracket attached to the seatback frame below the guide member, the slide bracket having a slot; and
    a headrest arrangement movably associated with the seatback frame, the headrest arrangement including a headrest and a support structure connected to the headrest, the support structure being engageable with the guide member and including a projection that extends into the slot and that is movable with respect to the slide bracket from an initial position to an actuated position, wherein upon sufficient impact to the vehicle, the projection moves from the initial position toward the actuated position and the support structure moves along the guide member, such that movement of the headrest is guided to provide support for the head of an occupant.

2. The vehicle seat of claim 1 wherein the projection extends laterally with respect to the seatback frame.

3. The vehicle seat of claim 1, wherein the seatback frame includes first and second side supports spaced laterally apart from each other, the slide bracket is attached to the first side support, and the flange is disposed between the slide bracket and the first side support.

4. The vehicle seat of claim 1 wherein the projection comprises a peg and a bushing disposed about the peg, the bushing extending into the slot.

5. The vehicle seat of claim 4 wherein the bushing comprises plastic.

6. The vehicle seat of claim 5 wherein the peg comprises steel.

7. The vehicle seat of claim 1 wherein the projection comprises a shoulder bolt.

8. The vehicle seat of claim 1 wherein the support structure includes a main body connected to the headrest, the main body having a threaded aperture, and wherein the projection includes threads that are engaged with the threaded aperture.

9. The vehicle seat of claim 1 wherein the slot includes a curved portion.

10. The vehicle seat of claim 9 wherein the slot further includes a straight portion extending from the curved portion.

11. The vehicle seat of claim 10, wherein the straight portion extends at an angle in a range of 0 to 45 degrees.

12. The vehicle seat of claim 1 further comprising an additional slide bracket attached to the seatback frame and having a slot, and an additional projection attached to the support structure and extending into the slot of the additional slide bracket, wherein the additional projection is movable with respect to the additional slide bracket from an initial position to an actuated position extending above and rearward of the initial position, such that upon the sufficient impact to the vehicle the additional projection moves from the initial position toward the actuated position, thereby further guiding movement of the headrest.

13. The vehicle seat of claim 1 wherein the headrest arrangement is configured to move as a result of inertia of the headrest.

14. The vehicle seat of claim 1 wherein the support structure includes an impact target, and wherein a sufficient rearward force upon the impact target in response to the sufficient impact to the vehicle causes the projection to move from the initial position toward the actuated position.

15. The vehicle seat of claim 1 wherein the headrest arrangement is pivotable with respect to the seatback frame about a pivot axis, and the slide bracket and projection are disposed beneath the pivot axis.

16. The vehicle seat of claim 1 wherein the actuated position of the projection extends above and rearward of the initial position.

17. The vehicle seat of claim 1 wherein the slide bracket is formed integrally with the seatback frame.

18. A vehicle seat comprising:
    a seat back frame having first and second side supports spaced laterally apart from each other, and a cross member disposed between the side supports;
    a guide member attached to the cross member;
    first and second slide brackets respectively attached to the first and second side supports below the guide member, each slide bracket having a slot that includes a curved portion; and
    a movable headrest arrangement pivotally associated with the seatback frame, the headrest arrangement having a headrest and a support structure connected to the headrest, the support structure being engageable with the guide member and including an impact target and first and second laterally extending projections associated with the impact target, each projection including a peg and a bushing disposed about the peg, each projection extending into a respective slot, such that the bushing extends into the slot, and being slidable along the slot from an initial position to an actuated position disposed above and rearward of the initial position, wherein a sufficient rearward force upon the impact target causes the projections to move from the initial positions to the actuated positions and further causes the support structure to move along the guide member, such that the headrest moves upwardly and forwardly.

19. The vehicle seat of claim 1 wherein the support structure includes a main body connected to the headrest, the projection is attached to the main body at an attachment location, and the slide bracket extends between the flange and the attachment location.

20. The vehicle seat of claim 10, wherein the straight portion of the slot extends above the curved portion.

21. A vehicle seat for use with a vehicle, the vehicle seat comprising:

a seatback frame;

a guide member attached to the seatback frame;

a slide bracket attached to the seatback frame below the guide member, the slide bracket having a slot;

a headrest arrangement movably associated with the seatback frame, the headrest arrangement including a headrest and a support structure connected to the headrest, the support structure being engageable with the guide member and including a projection that extends into the slot and that is movable with respect to the slide bracket from an initial position to an actuated position, the projection including a main body and a bushing disposed about the main body and extending into the slot, wherein upon sufficient impact to the vehicle, the projection moves from the initial position toward the actuated position and the support structure moves along the guide member, such that movement of the headrest is guided to provide support for the head of an occupant.

* * * * *

UNITED STATES PATENT AND TRADEMARK OFFICE
CERTIFICATE OF CORRECTION

PATENT NO.    : 6,789,846 B2
DATED         : September 14, 2004
INVENTOR(S)   : Mladen Humer et al.

It is certified that error appears in the above-identified patent and that said Letters Patent is hereby corrected as shown below:

Column 4,
Line 48, after "actuated position," insert therefor:
-- the projection including a flange that is engageable with the slide bracket to inhibit transverse movement of the headrest arrangement, --.

Signed and Sealed this

Fourteenth Day of December, 2004

JON W. DUDAS
*Director of the United States Patent and Trademark Office*

UNITED STATES PATENT AND TRADEMARK OFFICE
CERTIFICATE OF CORRECTION

PATENT NO. : 6,789,846 B2
DATED : September 14, 2004
INVENTOR(S) : Mladen Humer et al.

It is certified that error appears in the above-identified patent and that said Letters Patent is hereby corrected as shown below:

Column 5,
Line 48, after "actuated position," insert therefor:
-- the projection including a flange that is engageable with the slide bracket to inhibit transverse movement of the headrest arrangement, --.

Signed and Sealed this

Seventeenth Day of May, 2005

JON W. DUDAS
*Director of the United States Patent and Trademark Office*